No. 685,402. Patented Oct. 29, 1901.
G. G. HOWE.
CONVEYER.
(Application filed Oct. 27, 1900.)
(No Model.)
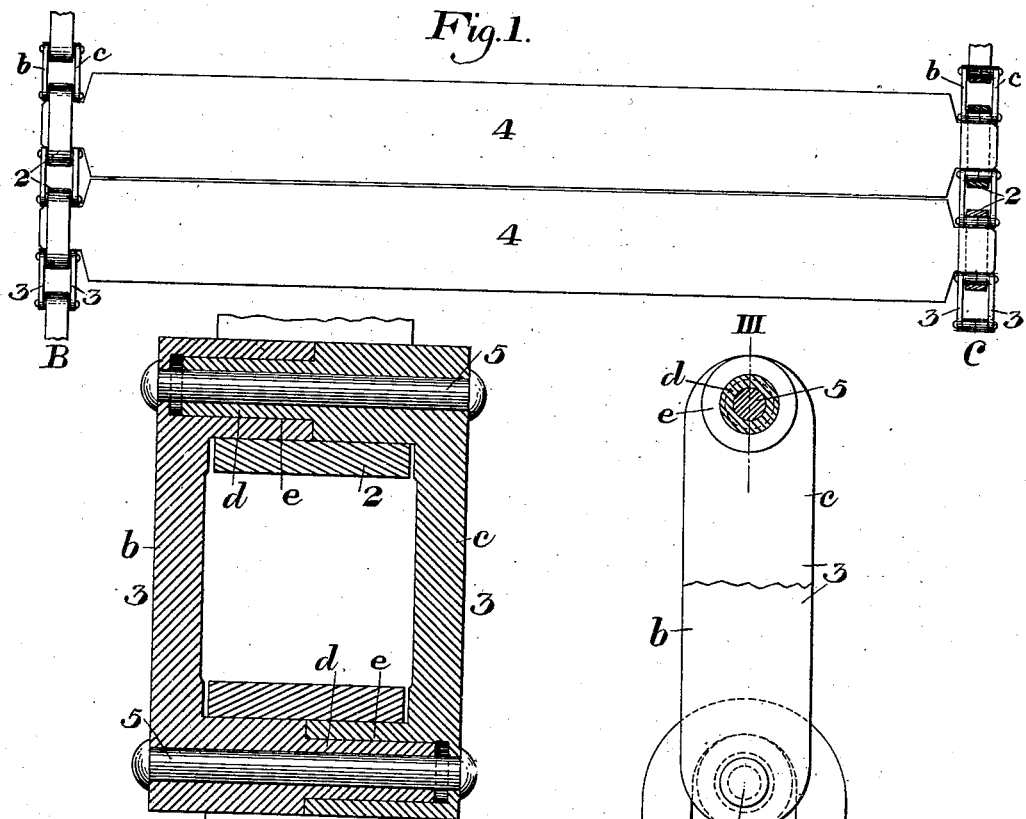
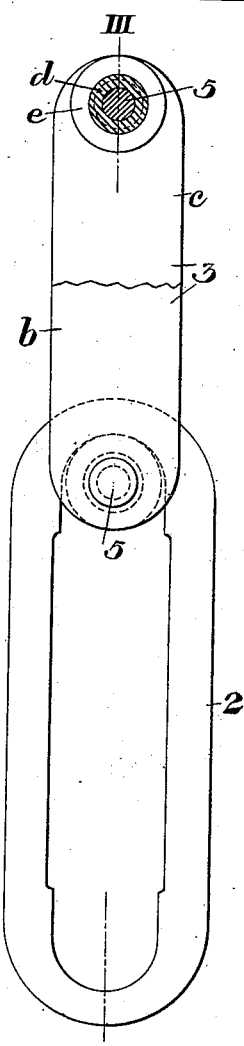
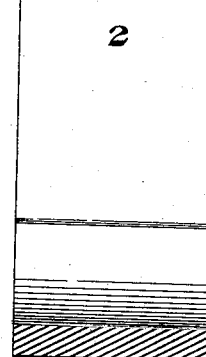
WITNESSES
INVENTOR

UNITED STATES PATENT OFFICE.

GLENN G. HOWE, OF INDIANAPOLIS, INDIANA, ASSIGNOR TO THE EWART MANUFACTURING COMPANY, OF CHICAGO, ILLINOIS, A CORPORATION OF ILLINOIS.

CONVEYER.

SPECIFICATION forming part of Letters Patent No. 685,402, dated October 29, 1901.

Application filed October 27, 1900. Serial No. 34,603. (No model.)

*To all whom it may concern:*

Be it known that I, GLENN G. HOWE, of Indianapolis, in the county of Marion and State of Indiana, have invented a new and useful Improvement in Conveyers, of which the following is a full, clear, and exact description, reference being had to the accompanying drawings, forming part of this specification, in which—

Figure 1 is a plan view showing two slats of a conveyer provided with my improved chain. Fig. 2 is a side elevation of two of the links, one of them partly broken away. Fig. 3 is a section on the line III III of Fig. 2.

My invention relates to an improvement in that class of chain conveyers in which cross-slats of wood or metal are carried by and between two parallel chains and are supported by insertion of their ends in slotted links of both chains. Difficulty has been experienced in the use of these chains in replacing slats which happened to be broken or injured, for heretofore the only way in which a new slat could be substituted for a broken one has been by spreading the two chains apart laterally sufficiently to permit the insertion of the ends of the slat; but in so doing the adjacent slats were also apt to fall out and could not easily be replaced.

My invention entirely obviates this difficulty and renders the replacing of the slats a simple and convenient matter. For this purpose I provide chains having, in combination with the slotted links in which the ends of the slats are carried, intermediate links made in sections which are detachable, so as to free the slotted links to which they are connected, and thus to enable the slotted links to be placed upon the slat or slats which are to be inserted in the conveyer, said sections being provided with easily-detachable fastening devices, by which they are held together.

In the drawings, in which I show the preferable form of my invention, 2 2 represent the slotted links which carry the ends of the slats, and 3 3 are the intermediate detachable links which are adapted to engage the teeth of the sprocket-wheels by which the conveyer is operated. The sections of each of the links 3 3 are separable from each other in a lateral direction, the two sections $b$ $c$ of which it is composed being preferably interfitted at the end bars by tongues $d$ $d$, fitting within sockets $e$ $e$. I prefer to form a socket $e$ on the section $c$ at one end of the link and on the section $b$ at the other end of the link.

If now any one of the slats 4 needs to be replaced, instead of having to spread the two chains B C of the conveyer it is only necessary to detach the sections of the two links 3 adjacent to one end of the slat by cutting off the heads of the rivets 5, and when these are detached the intermediate slotted link 2 may be drawn out laterally, so that it may receive the end of the new slat without disturbing any of the other slats. After the insertion of the new slat the detachable links 3 3 can be readjusted without difficulty.

Within the scope of my invention as defined in the claim changes may be made in the form and construction of the links without departure from my invention, since

What I claim is—

A conveyer-chain having solid links provided with lateral openings adapted to receive slats, and intermediate links made of separable sections and having openings adapted to pass over the teeth of sprocket-wheels, the last-named links being provided with easily-detachable means by which the sections are held together; substantially as described.

In testimony whereof I have hereunto set my hand.

GLENN G. HOWE.

Witnesses:
 THOMAS W. BAKEWELL,
 L. C. HOWE.